Patented Feb. 15, 1949

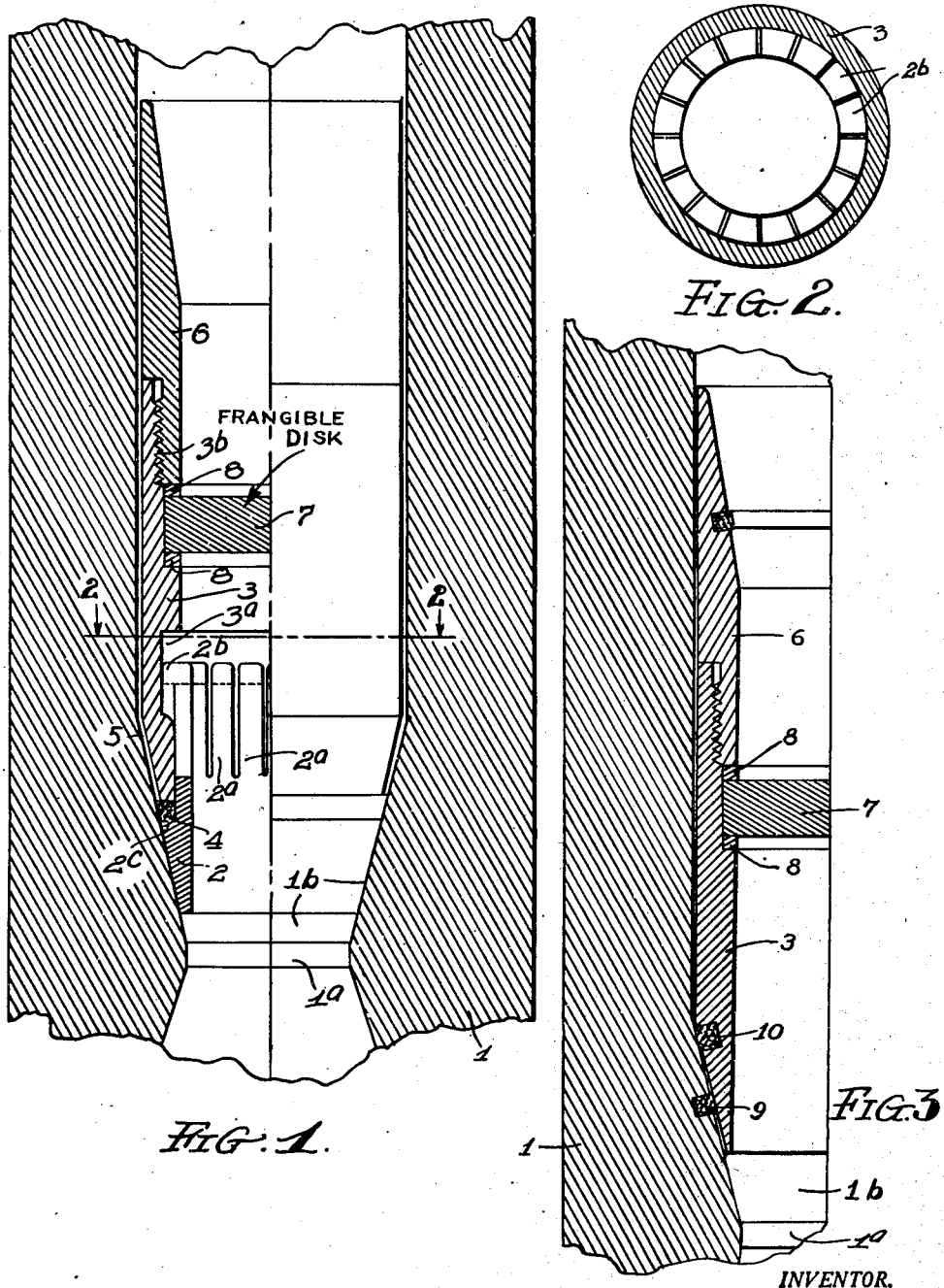

2,461,727

UNITED STATES PATENT OFFICE 2,461,727

MEANS AND METHOD FOR DETECTING LEAKS IN DRILL STEMS

Robert I. Gardner, San Diego, Calif.

Application January 20, 1945, Serial No. 573,705

5 Claims. (Cl. 137—77)

1

My invention relates to a means and method for detecting leaks in drill stems and the underlying or basic object of my invention is to detect any leak as the sign of incipient failure at some underground point of the hollow drill rods used in rotary drilling. As the drill stem is heavily stressed and subject to much abuse while in service, it is quite usual for it to fail. By failure is meant non-performance of either the function of mechanical transmission of power or the function of transmission of drilling fluid to the bottom of the hole. Failure may occur through the loosening of the members of the tool joints. Most often, however, failure occurs from overstressing. In either case, the failure is of a progressive nature and occurs while drilling is in progress. Failure usually starts from a leak at a tool joint or from cracking of the material of the drill stem. The cracks are usually typical of fatigue failures, i. e., internal rupturing of the material in a progressive manner until there is insufficient material remaining to sustain the applied loads. When this occurs a sudden rupture results and the drill stem is parted. When parting occurs circulation below the section of failure stops, and the section below the failure has been severed from any surface connection, a contingency which is extremely costly in both time and material, often resulting in an abandonment of that particular hole. Inasmuch as the failures are of a progressive nature, a leak in the drill stem will always occur before final rupture or final uncoupling. In actual practice the time interval between the first leak and final rupture usually is of the order of half an hour. Thus it is readily seen that any method of definitely locating the presence of a leak will be of value in that it will also determine whether or not there are any incipient failures in the drill stem. If the indications are that there is a leak in the drill stem it can immediately be removed from the hole, the leak found, the leaky section removed, the pipe run back in the hole, and drilling resumed with a minimum of inconvenience and risk.

More particularly then, the objects of this invention are:

First, to provide a means and method to detect such a leak and the incipient failure it represents in time to prevent actual failure;

Second, to provide means for detecting such a leak which means will not complicate drilling procedure;

Third, to provide such a device without interfering with the efficiency of standard drilling equipment;

Fourth, to provide such a device which will actually save, on the average, considerable time and labor in rotary drilling;

Fifth, to provide such a device employing discs which will be automatically rendered harmless after their use without extra time and labor being devoted to their removal from the system;

Sixth, to provide a method of detecting leaks in drill stems during operation of the same which will prevent work stoppages, which entails the employment of a minimum of expandable material and which will reduce overall operating costs, and the apparatus of which are relatively simple to manufacture;

Seventh, to provide a method of testing for leaks in drill stems including the periodic placing of removable obstructions to the flow of drilling fluid at a point near the lower end of a string of a drill pipe, applying drilling fluid at a predetermined pressure to said drill pipe, noting any fall in pressure indicating a leak, and removal of said obstructions by increasing the pressure after the tests have been made.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary view of means used in my invention and showing a portion of a drill stem near the lower end of the same and equipped with the special features disclosed in this application, the apparatus being symmetrical about the center line as indicated; Fig. 2 is a sectional view taken from the line 2—2 of Fig. 1; Fig. 3 is a quarter sectional view illustrating a simplified modification of the apparatus in my invention.

Similar characters of reference refer to similar parts and portions throughout the several views of the drawings:

At some point in the stem, preferably immediately above the bit so that the whole stem may be tested, I insert a section of specially formed drill pipe 1 having a restriction in which the internal diameter at 1a is of a considerably smaller dimension than the internal diameter of the remainder of the pipe and this portion may best be in the form of a double truncated cone, as shown. The lower portion of the double conical section has little importance but the upper face 1b forms a seat for the exterior conical face of the hollow member 2 which has a plurality of fingers 2a at the upper end thereof, these fingers having terminal outwardly extending portions 2b adapted to contact the hollow member 3 at points within the internal undercut portion 3a, insertion of fingers 2a within the member 3 being made possible by making the fingers 2a of resilient material or heat treating the fingers to provide sufficient resilience. It will be noted that the member 2 is more or less free to slide relative to the member 3 and a sealing ring 4 of semi-resilient material is inserted around said member 2 and between the shoulder 2c and the lower end of the member 3, so that pressure applied on the member 3 will force the ring 4 to expand outwardly and thus seal off the clearance space 5 between the member 4 and the contiguous portion of the drill pipe 1. The lower edge of the undercut portion 3a may be bevelled to facilitate the removal of the fingered portion of the member 2 when it is desired to insert or replace the sealing ring 4.

The upper end of the member 3 is formed with a shoulder and internal threads 3b to engage the externally threaded portion of the hollow member 6, the main portion of which, like the member 3, has an external diameter slightly less than the internal diameter of the drill pipe 1, and the upper end of the member 6 is cone shaped for the purpose hereinafter disclosed.

The disc 7 is inserted between the lower end of the member 6 and the shoulder near the top of the member 3 and two gasket rings 8, 8 of suitable size and composition are used to make the connection leak-proof when the members 6 and 3 are screwed together, the threads used here being right hand or left hand to agree with the type of threads used in the remainder of the drill stem so that the connection will remain tight when torque is applied to the drill stem.

The whole assembly including the members 2, 3, 6 and 7 will slide down the drill pipe and seat on the upper conical face of the constriction in the drill pipe and the sealing ring 4 will make the frictional connection between the member 2 and the drill pipe 1 leak-proof.

The disc or slug 7 is specially constructed of material which, although possessing an appreciable structural strength, will rupture when under a pressure equal to or not much greater than the pressure under which drilling fluid can be normally supplied to the drill stem.

In order to facilitate the removal of the slug it is proposed that it be made of a brittle material having an appreciable structural strength. The characteristics of the material must be such that some perceptable pressure may be applied to the slug without its breaking. When sufficient pressure is applied to cause the slug to break it must immediately break into a number of pieces none of which is too large to pass through the restricted area and also the orifices in the bit. This material must also be of such a nature that these small pieces can be further reduced in size by the bit and subsequently removed from the hole in the same manner as are the drill cuttings.

These conditions are all met by a particular kind of glass. It is not the composition which is peculiar, but the internal stresses in the glass that are the result of the method of manufacture. The method of making this type of glass, although not new, is described here for record purposes.

In making the above mentioned slugs of this kind of glass they would be cast or hot pressed to the desired shape. While still hot and plastic the two flat surfaces would be simultaneously and identically rapidly cooled. After receiving this heat treatment, the outer material next to the flat surfaces would be in a state of compressive stress while the inner material would be in a state of tensile stress. To all appearances the slug made of this glass would be no different than if it were made of any ordinary glass. When, however, this particular type of glass slug is broken, it will immediately break into a large number of small pieces rather than only two or three, as could be expected from ordinary glass. By small pieces is meant having dimensions in the order of one-quarter of an inch.

This disc may, of course, be made of materials other than glass and need not be physically removed from the drill stem during operation, provided it can be ruptured as aforesaid so that normal flow of drilling fluid to the bit can be resumed after the test for leaks has been made.

In Fig. 3 I have shown a modification of my invention in which the member 2 has been deleted, the undercut 3a deleted from the member 3 and sealing rings 10 and 9 replace the single sealing ring 4. The sealing rings 10 and 9 are each inserted into grooves cut into the external and internal conical faces of the members 3 and 1 respectively. This modification is a simplification of the means shown in Fig. 1 and hereinbefore described. It will be noted that periodic tests, timed perhaps, with the insertion of additional lengths of drill pipe, may be made without removing the previously inserted assembled members 6, 3 and 2 since identical testing assemblies may be added and the lower members of the added assemblies will rest upon the upper conical face of the previously inserted member 6.

In employing my invention the driller will insert the constricted drill pipe 1 immediately above the bit or bit carrying member and proceed with normal drilling operation. Periodically thereafter whenever a leak is suspected or regularly as lengths of drill pipe are added at the upper end of the string he will insert a disc 7 with the disc carrying assembly including the members 6 and 3, and the member 2 if used, into the upper end of the string. This assembly will be forced down through the drill stem by gravity and when drilling fluid is again forced into the stem under pressure, preferably considerably less than normal operating pressure, this disc 7 and the sealing rings will effectively close the lower end of the drill stem against escape of the drilling fluid out of the drill stem. The driller will now watch closely to see whether the pressure, as indicated on the gauge normally used to indicate the pressure of the drilling fluid remains constant when the pump is stopped. If the pressure drops a leak is indicated and the drill pipe can be withdrawn and the faulty section replaced but if the pressure remains constant then no leak is indicated and by increasing the pressure on the drilling fluid, the disc 7 may be ruptured and normal drilling continued.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims:

Having thus described by invention, what I claim as now and desire to secure by Letters Patent is:

1. In a device to detect a leak in a drill stem, a hollow member which can be lowered into said stem, a constriction in said stem to limit the downward movement of said member, means to seal said member to said stem, and a sealing unit of predetermined strength to close said hollow member.

2. In a device to test for a leak in a drill stem, a member which can be lowered into said stem and comprised of two threadably engaged hollow members with a brittle sealing unit of predetermined strength held between said members and adapted to close the said stem, a constriction in said drill stem to limit the downward movement of said members, and a sealing ring to provide a pressure seal between one of said members and the contiguous portion of said stem.

3. A method of testing for a leak in a drill stem including sealing the lower end of said stem with a frangible member of lesser strength than the drill stem, noting any fall in pressure of drilling fluid supplied while the lower end is sealed, then rupturing the seal by increasing the pressure of the drilling fluid if no leak is indicated.

4. A method of testing for a leak in a drill stem including providing a constriction in said stem, lowering a hollow member closed by a sealing unit of predetermined strength within said stem to contact said constriction, sealing said member to said stem, supplying drilling fluid to said stem at a fixed pressure, noting whether said pressure falls, then fracturing said sealing unit if the test is successful.

5. In a device to test for a leak in a drill stem, a member which can be lowered into said stem and comprised of two threadably engaged hollow members with a brittle tempered glass unit of predetermined strength held between said members and adapted to close the said stem, a constriction in said drill stem to limit the downward movement of said members, and a sealing ring to provide a pressure seal between one of said members and the contiguous portion of said stem.

ROBERT I. GARDNER.

REFERENCES CITED

The following references are of record in the file of this patent:

UNITED STATES PATENTS

| Number | Name | Date |
| --- | --- | --- |
| 417,210 | Meriam | Dec. 10, 1889 |
| 975,638 | Rowswell | Nov. 15, 1910 |
| 1,159,950 | Kelly | Nov. 9, 1915 |
| 1,652,472 | Erwin et al. | Dec. 13, 1927 |
| 1,812,944 | Granger | July 7, 1931 |
| 2,067,499 | Millmine | Jan. 12, 1937 |
| 2,109,745 | Hayward | Mar. 1, 1938 |
| 2,113,856 | Parks | Apr. 12, 1938 |
| 2,212,491 | Appleby | Aug. 27, 1940 |
| 2,277,110 | Johnson | Mar. 24, 1942 |
| 2,290,179 | Hayward | July 21, 1942 |
| 2,300,823 | Whitman | Nov. 3, 1942 |
| 2,312,018 | Beckman | Feb. 23, 1943 |
| 2,312,789 | Appleby | Mar. 2, 1943 |
| 2,332,567 | Gardner | Oct. 26, 1943 |
| 2,342,616 | O'Brien | Feb. 22, 1944 |
| 2,353,254 | McCandless | July 11, 1944 |
| 2,365,794 | Armentrout | Dec. 26, 1944 |

FOREIGN PATENTS

| Number | Country | Date |
| --- | --- | --- |
| 558,659 | Great Britain | Jan. 14, 1944 |